W. C. MEADOWS.
POWER PLANT.
APPLICATION FILED APR. 13, 1912.
1,047,675.
Patented Dec. 17, 1912.
2 SHEETS—SHEET 2.
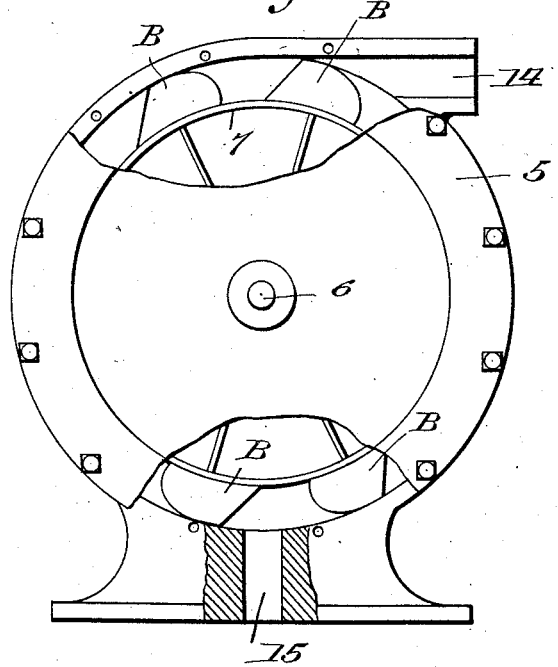
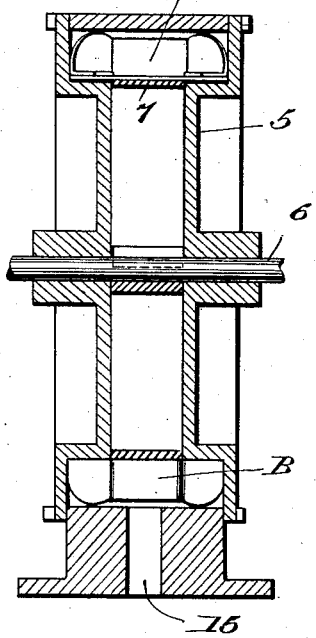
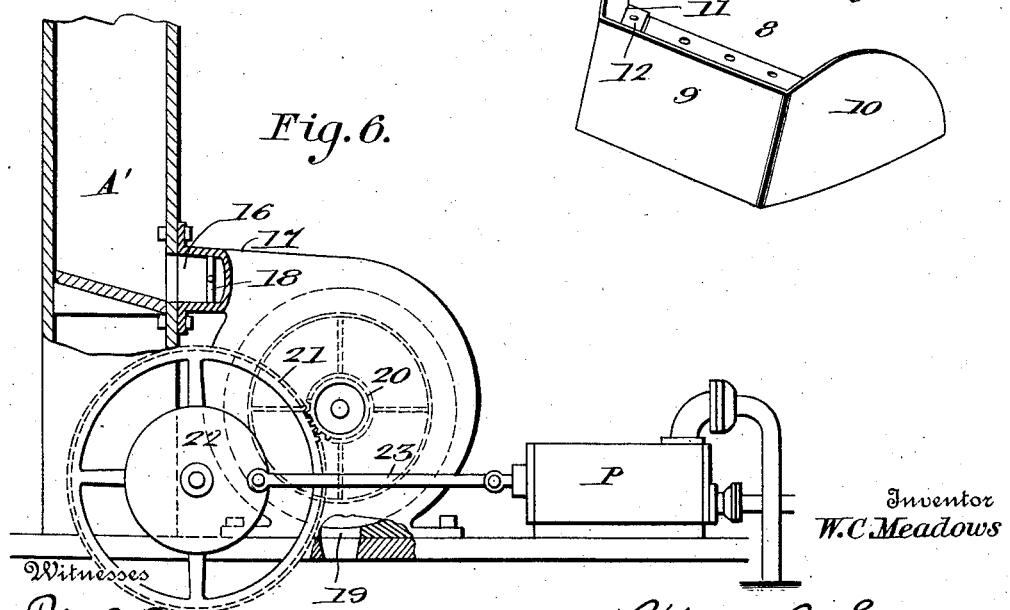

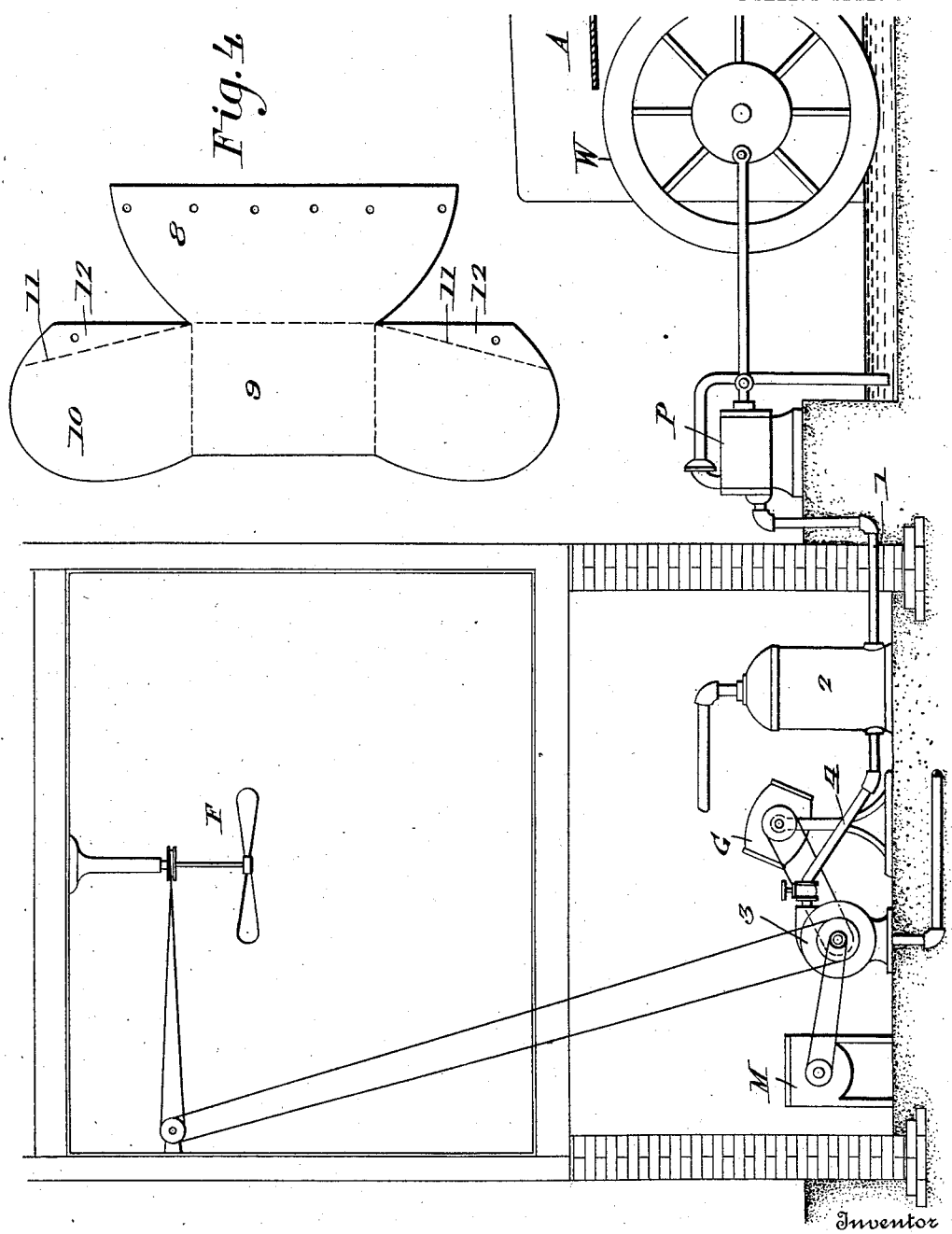

UNITED STATES PATENT OFFICE.

WILLIAM C. MEADOWS, OF POORS KNOB, NORTH CAROLINA.

POWER PLANT.

1,047,675.  Specification of Letters Patent.  Patented Dec. 17, 1912.

Application filed April 13, 1912. Serial No. 690,543.

*To all whom it may concern:*

Be it known that I, WILLIAM C. MEADOWS, a citizen of the United States of America, residing at Poors Knob, in the county of Wilkes and State of North Carolina, have invented new and useful Improvements in Power Plants, of which the following is a specification.

This invention relates to improvements in hydraulic power plants and motors and has particular application to that type of power plant wherein a water wheel is sunk or fastened in a stream or race way so that the moving water may turn the wheel for power purposes.

In carrying out my present invention, it is my purpose to provide a hydraulic power system wherein by means of a motor sunk in a race way or stream water may be conveyed to a desired point for consumption or utilization and put under pressure and subsequently utilized for driving various household articles and the like, such as churns, fans, washing machines and numerous other devices.

It is also my purpose to provide a water motor wherein the water wheel thereof may be driven by impact and the jet of water impinging against the wheel confined in such manner as to obtain the maximum driving power therefrom.

With the above and other objects in view, the invention consists in the construction, combination and arrangement of parts hereinafter set forth in and falling within the scope of the appended claim.

In the accompanying drawings: Figure 1 is a diagrammatic view of a hydraulic power system constructed in accordance with my invention. Fig. 2 is a side elevation, parts being broken away of a water motor constructed in accordance with my invention. Fig. 3 is a vertical central sectional view of a water motor. Fig. 4 is a plan view of one of the buckets carried by the motor showing the manner of making the same. Fig. 5 is a detail perspective view of a bucket made up, and Fig. 6 is a modified form of mechanism for forcing the water to the point of utilization.

Similar reference characters designate like parts throughout the several views.

In practising my invention, a suitable form of water wheel is located within a water race way or mill stream and driven from the body of water flowing through such stream or race way to operate a pump whereby water from the same stream or another stream or the like may be forced to the desired point of consumption and stored under pressure and subsequently utilized for various household purposes. In accordance with my invention, the water after being sucked up by the pump is forced into an air tank with the effect to compress the air in such tank which in turn puts the water under pressure so that the same may be delivered to various parts of the dwelling or other building in which the system is installed.

Referring now to the accompanying drawings in detail, A indicates a race way or mill stream through which a body of water flows at a high velocity, and in this stream or race way is sunk or otherwise embedded a suitable form of water wheel W which in this instance is constructed in any suitable or preferred manner. Connected to the wheel W is a pump P provided with suitable check valves and designed to draw water from the stream A or other suitable source and force the same to the point of consumption. Leading from the pump P to the point of consumption is a delivery pipe 1 terminating in a pressure tank 2 connected up to a suitable source of air pressure and adapted to receive the water from the pump P so that such water may be put under pressure incident to the air within the tank 2, as will be readily understood. This tank 2, as shown in Fig. 1, may be piped up to various plumbing appliances of the household to supply water thereto and is also connected to a water motor 3, the detail construction of which will presently appear, by way of a valved conduit 4 and this motor 3 has its driving shaft belted up or otherwise suitably connected to a churn G, washing machine M, and fan F and may also be connected to various other household devices which require power to operate the same.

From the foregoing, it will be seen that the water is taken direct from the stream or the like and pumped to the point of consumption where it is put under pressure or stored so that such water may be utilized when desired.

The water motor 3, as shown in Figs. 2 and 3, embodies a circular casing 5 in the side walls of which is journaled a shaft 6 arranged transversely and centrally of the casing and provided with a water wheel 7 keyed upon the shaft 6 in any suitable manner so that in the movement of the wheel motion may be transmitted to such shaft. The wheel 7 is adapted to be driven by impact and is provided with a plurality of peripherally arranged buckets which receive the water and owing to the impact of the water thereon drive the shaft 6. These buckets are constructed in such manner as to retain the water for a suitable length of time after the same has impinged thereon to assist in the transmission of motion to the shaft 6 and also confine the water to the periphery of the wheel and prevent the splashing of such water upon the casing. Thus, the water is held within the buckets and caused to act thereon in such manner as to give up its maximum driving capacity. The buckets, as shown in Figs. 4 and 5, are indicated as an entirety by the letter B and each is stamped from a single sheet of metal and is shaped, as disclosed in Fig. 4, to provide a fastening flange 8, an impact flange 9 and deflector wings 10, 10 integral with the impact flange 9 and arranged at the opposite sides of such flange. The lower edges of the wings 10, 10 are adapted to be bent upon a line, as 11, arranged at an angle to the juncture of the impact flange 9 with the fastening flange 8 to form securing plates 12, 12, each of which engages the upper surface of the proximate side of the flange 8 to form the bucket, as shown in Fig. 5, suitable bolts or rivets being passed through the plates 12 and flange 8 to hold the metal in bucket formation. If desired, the buckets may be cast or molded to present the shape above described. The buckets thus constructed, are arranged about the periphery of the wheel 7 and by means of the fastening flange 8 are bolted or otherwise suitably fastened to such wheel and are adapted to receive the water by impact and confine the same within themselves to obtain the maximum driving power of such water. The casing 5, is provided with an inlet 14 adapted to discharge the water into the buckets at a tangent to the wheel and this inlet 14 is disposed at the upper sides of the casing 5, while the lower side of such casing is provided with an outlet 15 by means of which the water is discharged from the casing. Thus, when the water strikes the buckets on the wheel 7, the wheel is driven by impact and the water prevented from splashing owing to the formation of the buckets and confined within such buckets, so that when the buckets have passed the inlet 14, the water will be retained within the buckets to facilitate the driving of the wheel, owing to the water within the buckets tending to seek the center of gravity, as is obvious.

Referring now to the modification shown in Fig. 6, the race way or mill stream is indicated at A' and terminates in a contracted outlet 16 having communication with a casing 17 of a water motor, communication between the casing 17 and the race way A' being controlled through the medium of a regulating valve 18. Within this casing 17, is located a water wheel carrying upon its periphery a plurality of buckets constructed in a manner identical to that hereinbefore described with reference to the wheel 7. This casing 17, is also provided with an outlet 19 which may be carried back to the race way A' so that the water after being utilized in the water motor may be taken back to the race way. The shaft of the wheel of this motor has keyed thereto in any suitable manner exteriorly of the casing 17 a pinion 20 meshing with a gear 21 keyed upon a crank shaft 22 to which is connected the pump rod 23 of the pump P.

From the foregoing description taken in connection with the accompanying drawings, the construction, mode of operation and manner of employing my invention will be readily apparent to those skilled in the art to which the invention appertains, and while I have herein shown and described certain preferred forms of my invention by way of illustration, it is to be understood that I do not limit myself to the exact details of construction herein described and delineated, as modification and variation may be made within the scope of the claim and without departing from the spirit of my invention.

I claim:

In a water motor, a casing, a wheel rotatably mounted in the casing and adapted to be driven by impact, buckets secured to the periphery of the wheel, each bucket consisting of a sheet of metal bent to provide a fastening flange and an impact flange, deflector wings connected to the opposite sides of the impact flange and bent on a line at an angle to the impact flange at the juncture of the latter with the fastening flange to form securing plates adapted to be fastened to the fastening flange, an inlet for the casing arranged at a tangent to the periphery of the wheel, and an outlet for the casing.

In testimony whereof I affix my signature in presence of two witnesses.

WILLIAM C. MEADOWS.

Witnesses:
   Mrs. R. C. Jennings,
   R. C. Meadows.